United States Patent
Borkowski et al.

(10) Patent No.: US 10,042,371 B2
(45) Date of Patent: Aug. 7, 2018

(54) SMART DRAIN AND METHOD OF CONTROL

(71) Applicant: Ingersoll-Rand Company, Davidson, NC (US)

(72) Inventors: Michael R. Borkowski, Concord, NC (US); Dwight David Isenhour, Mooresville, NC (US)

(73) Assignee: Ingersoll-Rand Company, Davidson, NC (US)

( * ) Notice: Subject to any disclaimer, the term of this patent is extended or adjusted under 35 U.S.C. 154(b) by 70 days.

(21) Appl. No.: 14/955,951

(22) Filed: Dec. 1, 2015

(65) Prior Publication Data

US 2016/0187890 A1  Jun. 30, 2016

Related U.S. Application Data

(60) Provisional application No. 62/098,809, filed on Dec. 31, 2014.

(51) Int. Cl.
*G05D 9/12* (2006.01)
*F16T 1/00* (2006.01)

(52) U.S. Cl.
CPC .................. *G05D 9/12* (2013.01); *F16T 1/00* (2013.01); *Y10T 137/3105* (2015.04); *Y10T 137/7313* (2015.04)

(58) Field of Classification Search
CPC ................ G05D 9/12; Y10T 137/3105; Y10T 137/7313; F16T 1/00
See application file for complete search history.

(56) References Cited

U.S. PATENT DOCUMENTS 4,974,626 A * 12/1990 Koch ........................ F16T 1/00
137/187
5,144,974 A * 9/1992 Gaudin ..................... F16T 1/00
137/204

(Continued)

FOREIGN PATENT DOCUMENTS

WO      2007133946 A2    11/2007

OTHER PUBLICATIONS

Beko Technologies Corp., Bekomat, Leading the Way in Compressed Air Condensate Drainage, Brochure, Oct. 2009, 8 pages.

*Primary Examiner* — Kevin Murphy
(74) *Attorney, Agent, or Firm* — Taft Stettinius & Hollister LLP (57) ABSTRACT

According to one aspect of the present disclosure, a drain system, including a sensor in communication with a reservoir and controller, uses algorithmic control of a drain valve to adjust the interval and duration of actuation of the drain valve to regulate a fluid level within the reservoir. In embodiments applying the drain system to a gas compressor system, the disclosed control algorithm enables the controller to prevent the loss of compressed gas through an open path out the drain and further to prevent condensate generated by operation of the compressor system from backing up in the reservoir and reentering the flow of compressed gas. The control algorithm adjusts the interval and period of actuation of the drain valve such that as operating conditions change the drain valve opens more or less frequently for longer or shorter periods in response to varying condensate load.

6 Claims, 3 Drawing Sheets

(56) References Cited

U.S. PATENT DOCUMENTS

| | | | |
|---|---|---|---|
| 5,337,779 A * | 8/1994 | Fukuhara | F16T 1/00 137/187 |
| 5,435,422 A | 7/1995 | Chille, Sr. | |
| 6,068,447 A | 5/2000 | Foege | |
| 6,196,253 B1 | 3/2001 | Love | |
| 6,276,894 B1 | 8/2001 | Koch | |
| 6,588,443 B2 | 7/2003 | Schlensker et al. | |
| 6,779,547 B1 | 8/2004 | Bowers | |
| 2014/0224339 A1 † | 8/2014 | Feltgen | |

\* cited by examiner
† cited by third party

SMART DRAIN AND METHOD OF CONTROL

CROSS REFERENCE TO RELATED APPLICATIONS

This application claims the benefit of U.S. Provisional Application No. 62/098,809, filed Dec. 31, 2014, which is incorporated herein by reference in its entirety.

TECHNICAL FIELD

The technical field generally relates to fluid drain systems, and more specifically, to electronic fluid drain systems for gas compressor systems.

BACKGROUND

Generally compressor systems are equipped with chillers and separators to remove at least some of the moisture entrained in the flow of the gas being compressed. Removing moisture from the gas being compressed reduces the work necessary to compress the gas and mitigates corrosion and moisture build up in downstream equipment supplied by the compressor system. The chiller reduces the temperature of the compressed gas, thus promoting the formation of condensation from the compressed gas as it enters the inlet of the separator. The separator causes the liquid condensate to settle to the bottom of the separator vessel while the compressed gas exits the separator above the inlet.

Condensate that has accumulated in the separator must be drained away to prevent it from backing up into the flow of compressed gas. However, the draining of the condensate must be controlled to prevent compressed gas from leaking from the system via the drain path, thereby reducing the efficiency of the compressor system. Typically, at least a small amount of condensate remaining in the bottom of the separator is desired to block the potential leak path out of the drain.

Two conventional means of controlling the draining of the condensate include timed solenoid systems and so-called no-loss systems. Timed solenoid systems open and close a drain valve downstream of the separator at predetermined intervals set by an operator. Such systems may include a high level sensor to shut down the compressor system if the condensate overfills the separator volume. Because the drain interval is set by an operator, the predetermined drain interval may not be appropriate for changing operating conditions, resulting in poor drainage. No-loss systems attempt to overcome this deficiency by controlling the flow of condensate through a separate reservoir connected to the bottom of the separator. However, such systems have proven unreliable. And, because the drain valve of the conventional no-loss system is not directly tied to a level sensor in the separator, a back-up drain valve is often needed, which increases costs. Therefore, further technological developments are desirable in this area.

SUMMARY

One embodiment of the present application is a unique compressor with a smart drain system. Other embodiments include apparatuses, systems, devices, hardware, methods, and combinations for compressor systems with a unique smart drain system. Further embodiments, forms, features, aspects, benefits, and advantages of the present application shall become apparent from the description and figures provided herewith.

DESCRIPTION OF ILLUSTRATIVE EMBODIMENTS

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

According to one aspect of the present disclosure, a drain system, including a sensor in communication with a reservoir and controller, uses algorithmic control of a drain valve to adjust the interval and duration of actuation of the drain valve to regulate a fluid level within the reservoir. In embodiments applying the drain system to a gas compressor system, the disclosed control algorithm enables the controller to prevent the loss of compressed gas through an open path out of the drain and further to prevent condensate generated by operation of the compressor system from backing up in the reservoir and reentering the flow of compressed gas. Specifically, the controller uses a time interval between a triggering of a level sensor and the known volume of the reservoir to determine a condensate load for the system, which is the amount of condensate precipitating from the compressed gas in a given time under the operating conditions of pressure, temperature, and humidity. The controller then adjusts the frequency and duration of actuation of the drain valve according to the condensate load. From cycle to cycle, the control algorithm adjusts the interval and period such that as operating conditions change the drain valve opens more or less frequently for longer or shorter periods in response to varying condensate load.

Figures 1, 2:
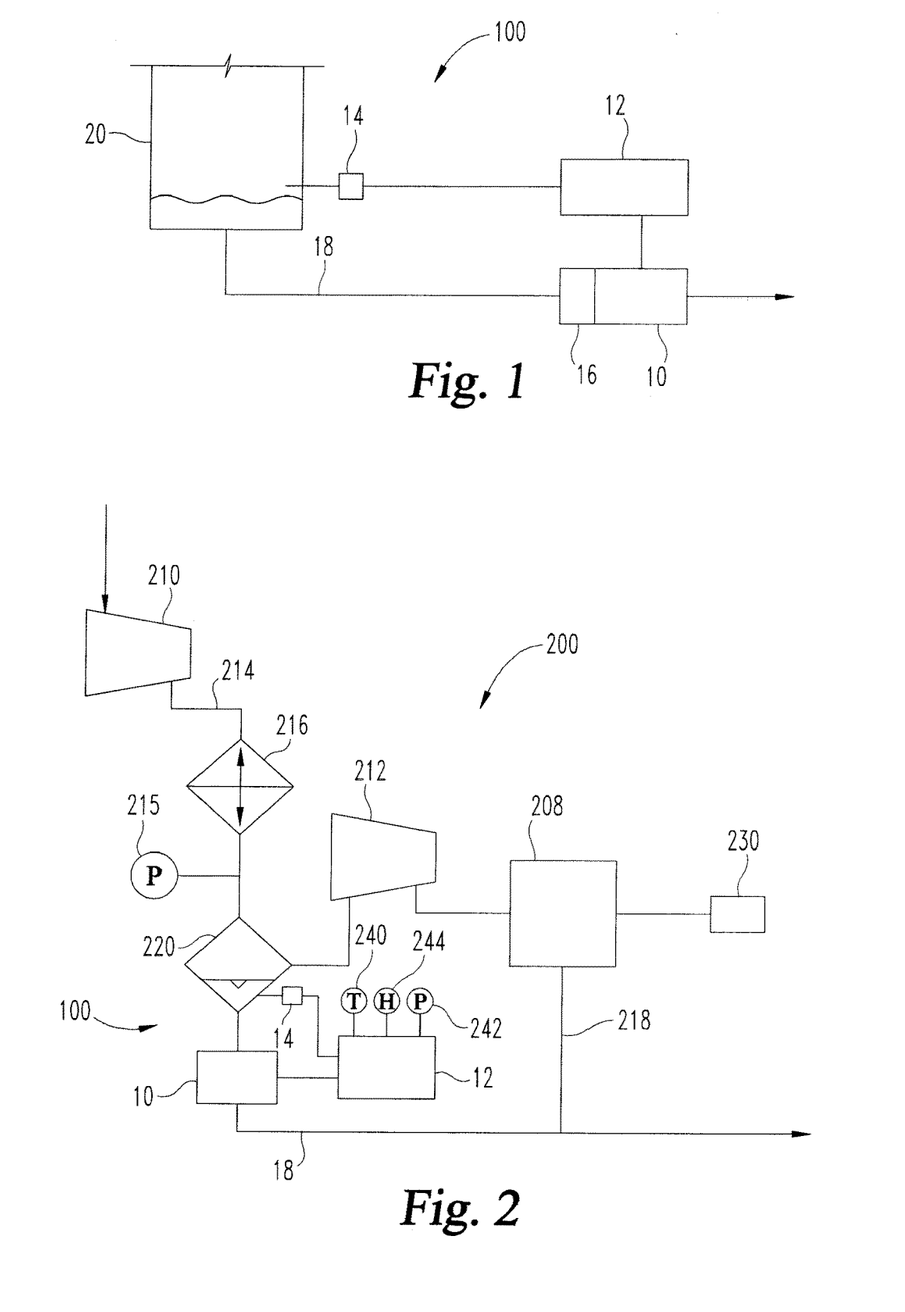
FIG. 1 is a schematic of a drain system according to an embodiment of the present disclosure.
FIG. 2 is a schematic of a compressor system according to an embodiment of the present disclosure.

Shown in FIG. 1 is an embodiment of a drain system according to the present disclosure. A drain system 100 may include a drain valve 10 in communication with a sensor 14 via a controller 12. The drain valve 10 may be in fluid communication with a fluid reservoir 20, such as a portion of a separator in a gas compressor system, via a drain line 18. The drain line 18 may terminate at an ambient condition. In certain embodiments, the drain valve 10 may be connected directly to the reservoir 20 such that the drain line 18 extends downstream of the drain valve 10 only. The drain system 100 enables control of the amount of the fluid in the reservoir 20. The controller 12 uses input from the sensor 14 to determine the relative amount of fluid in the reservoir 20 and to determine whether to open or close the drain valve 10 and for what duration or period, thereby controlling the amount of fluid in the reservoir 20. Accordingly, the sensor 14 is disposed in communication with the reservoir 20. In certain embodiments, the sensor 14 may be in contact with the reservoir 20. The sensor 14 further may be disposed at least partially within the reservoir 20 in those embodiments in which the sensor 14 makes physical contact with the fluid in the reservoir 20.

The drain valve 10 may be any type of electronically operated valve. In certain embodiments, the drain valve 10 may be a solenoid valve, either normally-open or normally-closed. The drain valve 10 may further include any suitable type of actuator capable of allowing and preventing flow from the reservoir 20. The sensor 14 may be a level sensor, such as a level float switch, a capacitive proximity switch, an electro-optic switch, a piezoelectric impedance sensor, or other suitable sensor capable of indicating whether the fluid is at or near the position of the sensor 14. In certain embodiments, the drain system 100 may include a strainer 16 positioned between the reservoir 20 and the drain valve 10. The strainer 16 may be, without limitation, a screen, mesh, perforated plate, semi-permeable paper, or other suitable filter capable of preventing particulate matter entrained in the fluid from entering the drain valve 10. Such particulate matter may choke, clog, or obstruct the drain valve 10, causing blockage, leakage, or failure of the valve.

The drain system 100 may be incorporated in a compressor system 200 structured to compress and at least partially dry a gas. In such an application, the drain system 100 may control the flow of a condensate, such as liquid water, generated within and expelled from the compressor system 200. As shown in FIG. 2, the compressor system 200 may include a low pressure compressor 210 and a high pressure compressor 212 connected by a compressed gas line 214. The compressor system 200 may further include a chiller 216 and a separator 220 in fluid communication with the low pressure compressor 210 and the high pressure compressor 212. The chiller 216 and the separator 220 can be located downstream of the low pressure compressor 210 and upstream of the high pressure compressor 212 along the compressed gas line 214. In other embodiments, the chiller 216 and separator can be located in other positions. The separator 220 is downstream of the chiller 216 such that undesired liquid that condenses from the gas as condensate due to compression by the low pressure compressor 210, and further due to a reduction in temperature in the chiller 216, may be removed from the compressed gas supplied to the high pressure compressor 212 and a point of use 230.

In applications where the gas to be compressed is air, the condensate may be liquid water from water vapor entrained in the air being compressed. Water vapor is undesired because it increases the work needed to further compress the air in the high pressure compressor 212 and because it may corrode pipes, lines, and equipment supplied by the compressor system 200. The compressor system 200 may further include a dryer 208 downstream of the high pressure compressor 212 to remove additional moisture from the compressed gas prior to be delivered to the point of use 230. The dryer 208 may be include a discharge line 218 in fluid communication with the drain line 18 to expel the additional condensate removed from the compressed gas. The compressor system 200 may further include a pressure sensor 215 located between the low pressure compressor 210 and the high pressure compressor 212 to measure the pressure in the compressed gas line 214 therebetween. As shown in FIG. 2, the pressure sensor 215 may be located at or near the separator 220.

In at least one embodiment of the present disclosure, the drain system 100 may be incorporated into the compressor system 200 such that the sensor 14 is in communication with the separator 220 as shown in FIG. 2. In such an embodiment, the drain system 100 can control the flow of condensate (e.g., liquid water) that is separated from the compressed gas in the separator 220. Alternatively, the compressor system 200 may include a separate reservoir or container (not shown in FIG. 2) located downstream (e.g., below) the separator 220. In such an embodiment, condensate segregated from the compressed gas in the separator 220 may flow into the container, and the sensor 14 may be in communication with the container, as is the reservoir 20 as shown in FIG. 1.

Operation of the drain system 100 will be described relative to the embodiment of the compressor system 200 shown in FIG. 2. The drain system 100 uses algorithmic control to adjust the interval and duration of actuation of the drain valve 10 to empty a sufficient amount of condensate from the separator 220 to prevent moisture build up in the compressor system 200 while further maintaining at least some condensate in the separator 220 to prevent the loss of compressed gas via the drain line 18. In operation, the controller 12 monitors the sensor 14, activating and deactivating the drain valve 10 according to a calculated condensate load on the compressor system 200. The controller 12 may include a startup mode or module, which operates when the compressor system 200 and the controller 12 are powered on. In startup mode, the drain valve 10 is closed as long as the pressure in the compressed gas line 214 is less than a threshold value. Keeping the drain valve 10 closed until the threshold pressure is exceeded prevents a backflow of condensate into the compressed gas line 214 should a vacuum have formed between the low pressure compressor 210 and the high pressure compressor 212 while the compressor system 200 was off. Such a vacuum may form due to cooling of the compressed gas. In at least one embodiment, the threshold pressure may be three (3) pounds per square inch gauge (psig).

Once the pressure in the compressed gas line 214 exceeds the threshold pressure, the controller 12 opens the drain valve 10 for an initial period to release condensate from the separator 220 that may accumulate when the compressor system 200 is not in use. After the initial period, the controller 12 closes the drain valve 10. By way of non-limiting example, the initial period may be two (2) seconds. In at least one embodiment, if the sensor 14 indicates the presence of condensate after the initial period, the controller 12 may command that the drain valve 10 remain open until the sensor 14 changes state plus the initial period. Consequently, the startup mode of the controller 12 provides a baseline condensate volume from which the controller 12 may monitor the amount and rate of accumulation of condensate in the separator 220. As will be appreciated, whether the drain valve 10 is opened or closed by energizing or de-energizing it will depend on whether the drain valve 10 is a normal-open or normally-closed type of valve. Regardless, for the purpose of the present disclosure, the terms energizing and activating are synonymous with opening the drain valve 10.

After the initial period, the controller 12 proceeds to a steady-state or normal mode of operation or module. In normal mode, the controller 12 monitors the sensor 14 and records a time interval (hereinafter referred to as the "fill interval") between the previous closing of the drain valve 10 and a change of state of the sensor 14, indicating of the presence of condensate in proximity to the sensor 14. The change of state of the sensor 14 may be conveyed to the controller 12 as a signal. In certain embodiments, the signal conveyed to the controller 12 may be delayed by a lag time. In such embodiments, the controller 12 may account for the lag time to commend the drain valve 10 as desired. In certain embodiments, the lag time may be about two (2) seconds.

The controller 12 may use the fill interval and the known volume of the separator 220 to calculate a condensate load on the compressor system 200, the condensate load being the rate at which condensate is being formed and accumulated in the separator 220. Given the condensate load, the controller 12 may determine a drain period, the drain period being the time duration to open the drain valve 10 and release at least a portion of the condensate that has accumulated in the separator 220 since the drain valve 10 was last closed. The drain period may be determined from the known volume of the separator 220, the pressure of the compressed gas line 214 from the pressure sensor 215 (i.e., the system operating pressure), and the known flow area through the drain valve 10. The drain period may further depend upon pressure losses in the drain valve 10 and drain line 18, which generally varies with each application or installation of the compressor system 200. Empirical testing of a specific application of the compressor system 200 may be desired to most accurately determine the rate at which condensate may drain from separator 220 in that specific application. Accordingly, the control algorithm to determine the drain period may be at least partially derived from testing of the compressor system 200 in a specific application during system setup.

The condensate load may be affected by environmental and system factors such as ambient temperature, pressure, and humidity affecting the state of the compressed gas and the system operating pressure, among other factors (collectively, the "system operating conditions"). Accordingly, in certain embodiments, the controller 12 may use the system operating conditions to determine the desired drain period. As shown in FIG. 2, the controller 12 may receive inputs of ambient temperature 240, ambient pressure 242, and ambient humidity 244, in addition to the system operating pressure from the pressure sensor 215. Moreover, the drain period may be affected by the configuration of the drain system 100 relative to the separator 220 and compressor system 200 and the pressure drops resulting from a specific configuration.

If all condensate is released from the separator 220 and drain system 100, including the drain line 18, compressed gas may bleed through the drain system 100, thereby reducing the system operating pressure and the efficiency of the compressor system 200. To prevent the loss of compressed gas, a sufficient amount of condensate must be maintained in the drain system 100 to block this potential leak path. Thus, the drain period determined by the controller 12 must allow for such a sufficient amount of condensate. In certain embodiments, a minimal amount of condensate may be maintained in the separator 220 or the reservoir 20 to provide a factor of safety for blocking the potential leak path. Alternatively, a minimal amount of condensate may be maintained in a portion of the drain line 18 connecting the separator 220 with the drain system 100.

Having determined the drain period, the controller 12 may open the drain valve 10 for the drain period to release the accumulated condensate, thereafter closing the drain valve 10, timing the next fill interval, and continuing to monitor the sensor 14. Upon recognizing a subsequent change of state of the sensor 14, the controller 12 may recalculate a new condensate load based on the most recent fill interval and the system operating conditions. The controller 12 may then use the new condensate load to calculate a new drain period.

The foregoing process of recording fill intervals and determining drain periods may be used to calculate a rolling or moving average of fill intervals from a previous number of cycles. By way of non-limiting example, the previous number of cycles may be five (5) cycles. Thereafter, the controller 12 may use the moving average of fill intervals to determine the condensate load and the corresponding drain period for the current system operating conditions. From cycle to cycle, the controller 12 may adjust the drain period such that as system operating conditions change the drain valve 10 is opened more or less frequently for longer or shorter drain periods. Once the compressor system 200 is operating in a steady-state condition, the condensate load generally changes gradually, based on compressor load and ambient conditions, among other factors. Thus, using the moving average of fill intervals enables the controller 12 to properly control draining of the separator 220 while relying on input from the sensor 14 only as a safety backup to prevent condensate from entering the compressed gas line 214. Not relying solely on input from the sensor 14 improves the reliability of the drain system 100 by minimizing the frequency of actuation of the drain valve 10 and enabling operation independent of the sensor 14.

Figure 3:
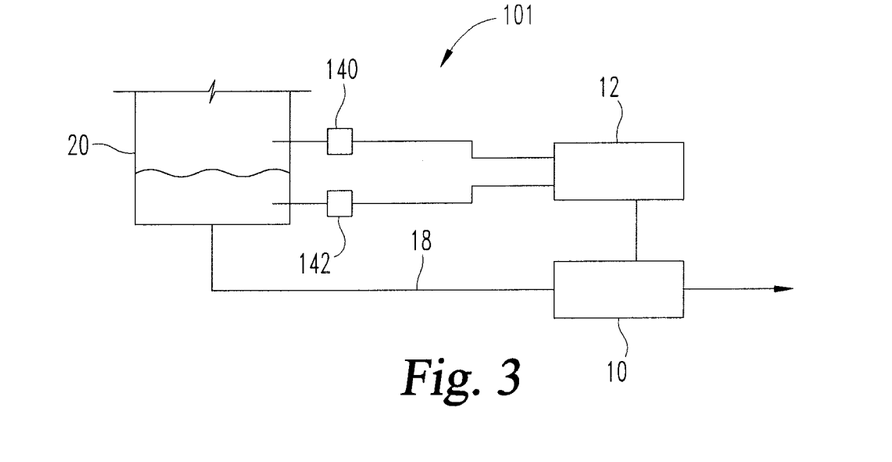
FIG. 3 is a schematic of a drain system according to an alternative embodiment of the present disclosure.

FIG. 3 illustrates an alternative embodiment of a drain system. As shown in FIG. 3, a drain system 101 may include a high level sensor 140 and a low level sensor 142, each in communication with the controller 12 and the reservoir 20. The high level sensor 140 and the low level sensor 142 each may be of a similar type as the sensor 14 as described herein, or each or one may be a different type. The high level sensor 140 may be located at a position relative to the low level sensor 142 associated with a greater amount of condensate in the reservoir 20. Conversely, the low level sensor 142 may be located at a position relative to the high level sensor 140 associated with a lesser amount of condensate in the reservoir 20.

Referring to FIGS. 2 and 3, in such an embodiment, controller 12 may use input from both the high level sensor 140 and the low level sensor 142 to determine the desired drain period to control the drain valve 10. Accordingly, in the startup mode the controller 12 may keep the drain valve 10 closed until the threshold pressure is exceeded to prevent a backflow of condensate from the reservoir 20. Once the pressure in the compressed gas line 214 exceeds the threshold pressure, the controller 12 may open the drain valve 10 for the initial period to release condensate from the reservoir 20 that may accumulate when the compressor system 200 is not in use. Alternatively or additionally, the controller 12 may open the drain valve 10 until the low level sensor 142 changes state, indicating that the amount of condensate in the separator has been reduced to a level in proximity to the low level sensor 142. After the initial period and/or once the low level sensor 142 changes state, the controller 12 may close the drain valve 10. Consequently, the startup mode of the controller 12 provides a baseline condensate volume from which the controller 12 may monitor the amount and rate of accumulation of condensate in the reservoir 20.

In the normal mode of operation of the drain system 101, the controller 12 may monitor both the high level sensor 140 and the low level sensor 142 and record a time interval between the previous closing of the drain valve 10 and a change of state of the high level sensor 140 to determine the fill interval. Alternatively, the controller 12 may monitor both the high level sensor 140 and the low level sensor 142 and record a time interval between the changes of state of each sensor 140, 142 to determine the fill interval. The controller 12 may further use the fill interval and the known volume of the reservoir 20 to calculate the condensate load on the compressor system 200. Given the condensate load, the controller 12 may determine the drain period. Having determined the drain period, the controller 12 may open the drain valve 10 for the drain period to release the accumulated condensate, thereafter closing the drain valve 10, timing the next fill interval, and continuing to monitor the high level sensor 140 and the low level sensor 142. Upon recognizing subsequent changes of state of the high level sensor 140 and the low level sensor 142, the controller 12 may recalculate a new condensate load based on the most recent fill interval and system operating conditions. The controller 12 may then use the new condensate load to calculate a new drain period. In certain embodiments of the drain system 101, the controller 12 may open the drain valve 10 when the high level sensor 140 changes state and close the drain valve 10 when the low level sensor 142 changes state.

As disclosed herein with respect to drain system 100, the controller 12 of the drain system 101 may calculate and use a moving average of fill intervals to determine the condensate load over time and subsequent drain periods for the current system operating conditions. Using the moving average of fill intervals enables the controller 12 to properly control draining of the reservoir 20 while using input from the high level sensor 140 and the low level sensor 142 only as a safety backup to prevent condensate from exceeding the volume of the reservoir 20 and to prevent the loss of compressed gas via the drain line 18. Not relying on input from the sensors 140, 142 during steady-state operation improves the reliability of the drain system 101.

Figure 4:
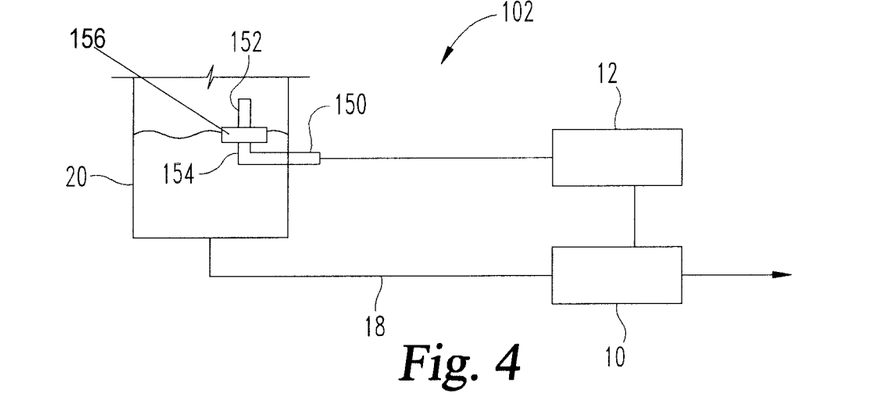
FIG. 4 is a schematic of a drain system according to a further alternative embodiment of the present disclosure.

FIG. 4 illustrates an alternative embodiment of a drain system. As shown in FIG. 4, a drain system 102 may include a float level sensor 150 in communication with the controller 12 and the reservoir 20. The float level sensor 150 may include a float 156, a high limit 152, and a low limit 154 incorporated into the single, integral float level sensor 150. In at least one embodiment, the float level sensor 150 may be located at least partially within the reservoir 20 such that the float 156 may translate the high limit 152 and the low limit 154 with the level of the condensate in the reservoir 20. The high limit 152 and the low limit 154 enable trigger points analogous to the combination of the high level sensor 140 and the low level sensor 142 of the drain system 101. Accordingly, in the drain system 102, the startup and normal modes of operation may function in a manner analogous to the operation of drain system 101, where the high limit 152 is located to provide the controller 12 with an indication that the amount of condensate in the reservoir 20 is greater than the amount of condensate indicated by the low limit 154.

In such an embodiment, the controller 12 of the drain system 102 may calculate and use a moving average of fill intervals to determine the condensate load over time and subsequent drain periods for the current system operating conditions using input from the high limit 152 and the low limit 154. Using the moving average of fill intervals enables the controller 12 to properly control draining of the reservoir 20 while using input from the high limit 152 and the low limit 154 only as a safety backup to prevent condensate from exceeding the volume of the reservoir 20 and to prevent the loss of compressed gas via the drain line 18 and the drain 10. Not relying on input from the high limit 152 and the low limit 154 during steady-state operation improves the reliability of the drain system 102.

Figure 5:
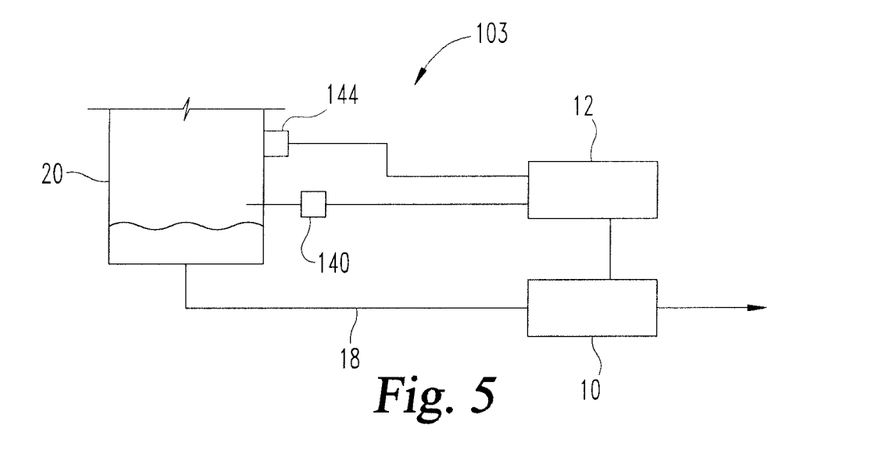
FIG. 5 is a schematic of a drain system according to another embodiment of the present disclosure.

FIG. 5 illustrates an alternative embodiment of a drain system. As shown in FIG. 5, a drain system 103 may include the high level sensor 140 and a pressure transducer 144, each in communication with the controller 12. The pressure transducer 144 may be any suitable type of electronic pressure measurement device, including but not limited to piezoelectric, piezoresistive strain gauge, capacitive, electromagnetic sensor types. In certain embodiments, the pressure transducer 144 may be a pressure switch providing a binary output indicating whether the sensed pressure is above or below a predetermined value. The high level sensor 140 may be similar to the sensor 14 as described herein.

Referring to FIGS. 2 and 5, in such an embodiment, the controller 12 may use input from the high level sensor 140 to determine the desired drain period to control the drain valve 10 as described with respect to the sensor 14 and the drain system 100. Accordingly, in the startup mode the controller 12 may keep the drain valve 10 closed until the threshold pressure is exceeded to prevent a backflow of condensate from the reservoir 20. Once the pressure in the compressed gas line 214 exceeds the threshold pressure, the controller 12 may open the drain valve 10 for the initial period to release condensate from the reservoir 20 that may accumulate when the compressor system 200 is not in use. Alternatively or additionally, the controller 12 may open the drain valve 10 until the pressure transducer 144 indicates a sufficient decrease in the pressure within the reservoir 20 so as to indicate that all or most all of the accumulated condensate has been released from the reservoir 20, thereby causing an open leak path for the compressed gas through the drain valve 10 and the decrease in pressure. After the initial period and/or once the pressure transducer 144 indicates the sufficient decrease in pressure, the controller 12 may close the drain valve 10. Consequently, the startup mode of the controller 12 provides a baseline condensate volume from which the controller 12 may monitor the amount and rate of accumulation of condensate in the reservoir 20.

In the normal mode of operation of the drain system 103, the controller 12 may monitor the high level sensor 140 and record a time interval between the previous closing of the drain valve 10 and a change of state of the high level sensor 140 to determine the fill interval. The controller 12 may further use the fill interval and the known volume of the reservoir 20 to calculate the condensate load on the compressor system 200. Given the condensate load, the controller 12 may determine the drain period. Having determined the drain period, the controller 12 may open the drain valve 10 for the drain period to release the accumulated condensate, thereafter closing the drain valve 10, timing the next fill interval, and continuing to monitor the high level sensor 140 and the pressure transducer 144. Upon recognizing subsequent changes of state of the high level sensor 140, the controller 12 may recalculate a new condensate load based on the most recent fill interval and the system operating conditions. The controller 12 may then use the new condensate load to calculate a new drain period. In certain embodiments of the drain system 103, the controller 12 may open the drain valve 10 when the high level sensor 140 changes state and close the drain valve 10 when the pressure transducer 144 indicates the sufficient decrease in pressure.

As disclosed herein with respect to drain system 100, the controller 12 of the drain system 103 may calculate and use a moving average of fill intervals to determine the condensate load over time and subsequent drain periods for the current system operating conditions. Using the moving average of fill intervals enables the controller 12 to properly control draining of the separator 220 while using input from the high level sensor 140 and the pressure transducer 144 only as a safety backup to prevent condensate from exceeding the volume of the reservoir 20 and to prevent the loss of compressed gas via the drain line 18. Not relying on input from the high level sensor 140 and the pressure transducer 144 during steady-state operation improves the reliability of the drain system 103.

Figure 6:
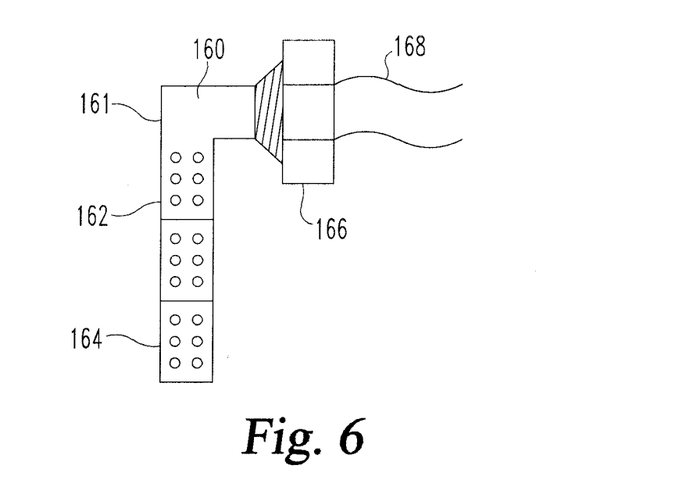
FIG. 6 is an illustrative view of a sensor according to an embodiment of the present disclosure.

In at least one embodiment of the present disclosure, the drain system 100 may include a dual-zone capacitive sensor 160. As shown in FIG. 6, the dual-zone capacitive sensor 160 may include a body 161 extending from a connector 166, the connector 166 structured to enable attachment to a reservoir, such as a separator of a compressor system. The body 161 may further include a high zone 162 and a low zone 164. As shown in FIG. 6, the high zone 162 may comprise the proximal end of the body 161, and the low zone 164 may comprise the distal end, such that the high zone 162 indicates a greater amount or level of condensate in the reservoir (not shown) than the low zone 164. Alternatively, the high zone 162 may comprise the distal end of the body 161, and the low zone 164 may comprise the proximal end; yet, the relative amounts of condensate indicated may be the same in an embodiment of the dual-zone capacitive sensor 160 in which the body 161 extends in a direction opposite that shown in FIG. 6. The dual-zone capacitive sensor 160 may further include one or more leads 168 to carry output from the dual-zone capacitive sensor 160 to the controller (not shown).

The dual-zone capacitive sensor 160 can independently detect changes in capacitance as the level of condensate in the reservoir approaches either the high zone 162 or the low zone 164. Accordingly, the high zone 162 and the low zone 164 enable trigger points analogous to the high limit portion 152 and the low limit portion 154 of the float level sensor 150 of the drain system 102. In an embodiment of a drain system incorporating the dual-zone capacitive sensor 160, the startup and normal modes of operation may function in a manner analogous to the operation of drain system 102, where the high zone 162 is located to provide the controller with an indication that the amount of condensate in the reservoir is greater than the amount of condensate indicated by the low zone 164.

In such an embodiment, the controller of the drain system may calculate and use a moving average of fill intervals to determine the condensate load over time and subsequent drain periods for the current operating system conditions using input from the high zone 162 and the low zone 164. Using the moving average of fill intervals enables the controller to properly control draining of the reservoir while relying on input from the high zone 162 and the low zone 164 only as a safety backup to prevent condensate from exceeding the volume of the reservoir and to prevent the loss of compressed gas via a drain line. Not relying on input from the high zone 162 and the low zone 164 during steady-state operation improves the reliability of the drain system.

The controller 12 may comprise digital circuitry, analog circuitry, or a hybrid combination of both of these types. Also, the controller 12 can be programmable, an integrated state machine, or a hybrid combination thereof. The controller 12 can include one or more Arithmetic Logic Units (ALUs), Central Processing Units (CPUs), memories, limiters, conditioners, filters, format converters, or the like which are not shown to preserve clarity. In one form, the controller 12 is of a programmable variety that executes algorithms and processes data in accordance with operating logic that is defined by programming instructions (such as software or firmware). Alternatively or additionally, operating logic for the controller 12 can be at least partially defined by hardwired logic or other hardware. It should be appreciated that the controller 12 can be exclusively dedicated to regulating actuation of the drain valve 10 or may further be used in the regulation, control, or activation of one or more other subsystems or aspects of the drain system 100 or compressor system 200.

The controller 12 may include one or more modules structured to functionally execute the operations of the controller 12. In certain embodiments, the modules of the controller 12 may correspond to the operating modes described herein. Accordingly, the controller 12 may include a module for operating in normal mode and a separate module for operating in startup mode. Alternatively, the controller 12 may include a module that executes both normal and startup modes. The description herein including modules emphasizes the structural independence of the aspects of the controller 12, and illustrates one grouping of operations and responsibilities of the controller 12. Other groupings that execute similar overall operations are understood within the scope of the present disclosure. Modules may be implemented in hardware and/or software on a non-transient computer readable storage medium, and modules may be distributed across various hardware or software components.

In one aspect, the present disclosure includes a method comprising: monitoring a sensor in communication with a reservoir that defines a volume capable of containing a fluid, the sensor structured to indicate the presence of the fluid at or near the sensor; when the sensor indicates the presence of the fluid, actuating a valve in fluid communication with the reservoir for a prescribed period, the valve structured to enable at least a portion of the fluid to drain from the reservoir; recording an interval since a previous actuation of the valve; calculating a load on the reservoir from the interval and the volume of the reservoir, the load defining the rate of accumulation of the fluid in the reservoir; calculating a new prescribed period and a prescribed interval using the load; and actuating the valve at the prescribed interval for the new prescribed period to drain fluid from the reservoir.

In refining aspects, the present disclosure includes a method wherein the load is further determined from one or more of a pressure within the reservoir, a pressure drop through the valve, an ambient temperature, an ambient pressure, and an ambient humidity; wherein the interval is a moving average of previous intervals between actuations of the valve; the method further comprising: prior to monitoring the sensor, monitoring a pressure within the reservoir; and when the reservoir pressure exceeds a first limit, actuating the valve for an initial period; the method further comprising: prior to monitoring the sensor, monitoring a pressure within the reservoir; when the reservoir pressure exceeds a first limit, opening the valve; and when the reservoir pressure falls below a second limit, closing the valve; wherein the prescribed period and the new prescribed period are further determined from one or more of the volume of the reservoir, an ambient pressure, a pressure within the reservoir, a flow area of the valve, and a pressure loss through the valve and through a line connecting the valve to ambient; wherein the reservoir is a portion of a separator of a compressor system; and wherein the sensor is level switch.

In one aspect, the present disclosure includes a method comprising: monitoring a first sensor and a second sensor, each in communication with a reservoir that defines a volume capable of containing a fluid, wherein the second sensor is disposed relative to the first sensor to indicate a lesser amount of the fluid in the reservoir; when the first sensor indicates the presence of the fluid, opening the valve to enable at least a portion of the fluid to drain from the reservoir; closing the valve upon a change of state of the second sensor; recording an interval between opening and closing of the valve; calculating a load on the reservoir from the interval and a volume of fluid drained from the reservoir; calculating a prescribed period and a prescribed interval using the load; and actuating the valve at the prescribed interval for the prescribed period to drain fluid from the reservoir.

In refining aspects, the present disclosure includes a method, wherein the volume of fluid drained from the reservoir is based on the volume of the reservoir and the position of the first sensor relative to the second sensor; wherein the first sensor and the second sensor are portions of an integral sensor assembly; and wherein the sensor assembly is a float level switch.

In another aspect, the present disclosure includes an apparatus comprising: a reservoir defining a volume in fluid communication with a fluid source; a first sensor disposed in communication with the reservoir and structured to indicate the presence of a fluid at or near the first sensor; a valve in fluid communication with the reservoir, the valve structured to selectively enable at least a portion of the fluid to flow out of the reservoir; and a controller in communication with the first sensor and the valve and structured to operate upon a change in a state of the first sensor, wherein the controller is configured to actuate the valve depending on the volume of the reservoir and an interval since a previous actuation of the valve.

In refining aspects, the present disclosure includes an apparatus, wherein the valve is a solenoid valve; wherein the controller is further configured to record the interval, calculate a fluid load on the reservoir based on the interval and the volume of the reservoir, and calculate a drain period and a new interval, whereby the controller opens the valve for the drain period after the new interval; further comprising a second sensor, the second sensor disposed in communication with the reservoir at a location corresponding to a lesser amount of the fluid in the reservoir relative to the first sensor, wherein the controller is further configured to actuate the valve depending on the interval between changes of state of the first sensor and the second sensor; wherein the first sensor and the second sensor are portions of a single device; the apparatus further comprising a drain line connecting the reservoir and the valve; wherein the apparatus is a portion of a compressor system comprising: a gas compressor structured to compress a gas; and a separator structured to facilitate the separation of water vapor entrained in the gas from the gas; and wherein the reservoir is a portion of the separator.

In another aspect, the present disclosure includes a method comprising: measuring predefined parameter inputs during operation of a gas compression system; separating liquid condensate from compressed gas; determining a rate of condensate accumulation in a reservoir based on the measuring; calculating with an electronic controller a time interval for draining the condensate from the reservoir based on the determining; and removing condensate from the reservoir at the calculated time interval.

In refining aspects, the present disclosure includes a method, further comprising preventing compressed gas from discharging during the removing; wherein the preventing includes leaving a portion of the condensate in the reservoir; wherein the measuring includes determining at least one of compressed gas mass flow, compressed gas pressure, compressed gas temperature, ambient pressure, ambient temperature, ambient relative humidity, and condensate level.

While the invention has been illustrated and described in detail in the drawings and foregoing description, the same is to be considered as illustrative and not restrictive in character, it being understood that only certain exemplary embodiments have been shown and described. A variety of further embodiments according to the present disclosure are contemplated. Those skilled in the art will appreciate that many modifications are possible in the example embodiments without materially departing from this disclosure. Accordingly, all such modifications are intended to be included within the scope of this disclosure as defined in the following claims.

What is claimed is:

1. An apparatus comprising:
   a reservoir defining a volume in fluid communication with a fluid source;
   a first sensor disposed in communication with the reservoir and structured to indicate the presence of a fluid at or near the first sensor;
   a second sensor, the second sensor disposed in communication with the reservoir at a location corresponding to a lesser amount of the fluid in the reservoir relative to the first sensor;
   a valve in fluid communication with the reservoir, the valve structured to selectively enable at least a portion of the fluid to flow out of the reservoir;
   a controller in communication with the first sensor and the valve and structured to operate the valve to release a portion of the fluid from the reservoir upon a change in a state of the first sensor until a change in a state of the second sensor when operating in a start up mode;
   wherein the controller is configured to record a time interval from a previous valve actuation event, calculate a fluid load on the reservoir based on the time interval from the previous actuation event and the volume of the reservoir, calculate a drain period and a new prescribed time interval based on the fluid load calculation and to actuate the valve for the drain period after the new time interval has elapsed; and
   wherein input from the first sensor and second sensor provides a backup to prevent condensate from exceeding the volume of the reservoir or prevent loss of compressed gas through a drain line during steady state operation of the apparatus.

2. The apparatus of claim 1, wherein the valve is a solenoid valve.

3. The apparatus of claim 1, wherein the first sensor and the second sensor are portions of a single device.

4. The apparatus of claim 1, the apparatus further comprising a drain line connecting the reservoir and the valve.

5. The apparatus of claim 1, wherein the apparatus is a portion of a compressor system comprising:
   a gas compressor structured to compress a gas; and
   a separator structured to facilitate the separation of water vapor entrained in the gas from the gas.

6. The apparatus of claim 5, wherein the reservoir is a portion of the separator.

* * * * *